United States Patent
Meier

(10) Patent No.: US 6,616,408 B1
(45) Date of Patent: Sep. 9, 2003

(54) BLADE AND ROTOR FOR A GAS TURBINE AND METHOD FOR LINKING BLADE PARTS

(75) Inventor: Reinhold Meier, Dorfen (DE)

(73) Assignee: MTU Aero Engines GmbH, München (DE)

(*) Notice: Subject to any disclaimer, the term of this patent is extended or adjusted under 35 U.S.C. 154(b) by 0 days.

(21) Appl. No.: 09/868,459

(22) PCT Filed: Dec. 4, 1999

(86) PCT No.: PCT/DE99/03891
§ 371 (c)(1),
(2), (4) Date: Sep. 24, 2001

(87) PCT Pub. No.: WO00/37210
PCT Pub. Date: Jun. 29, 2000

(30) Foreign Application Priority Data

Dec. 18, 1998 (DE) .......................................... 198 58 702

(51) Int. Cl.[7] .................................................. F01D 5/22
(52) U.S. Cl. .................................. 416/193 A; 29/889.1
(58) Field of Search ...................... 416/193 A; 219/9.5; 29/889.1, 889.21; 228/119

(56) References Cited

U.S. PATENT DOCUMENTS

| | | | |
|---|---|---|---|
| 2,019,329 A | 10/1935 | Warren | |
| 3,768,147 A | 10/1973 | Berry et al. | |
| 4,012,616 A | 3/1977 | Zelahy | |
| 4,144,433 A | 3/1979 | Zelahy | |
| 4,883,216 A | 11/1989 | Patsfall | |
| 5,197,190 A | * 3/1993 | Coolidge | .................. 29/889.1 |

FOREIGN PATENT DOCUMENTS

| | | |
|---|---|---|
| DE | 38 31 692 | 3/1989 |
| EP | 0 376 874 | 7/1990 |
| FR | 2 226 241 | 11/1974 |
| GB | 1 568 826 | 6/1980 |
| WO | 00/03834 | 1/2000 |

* cited by examiner

Primary Examiner—Edward K. Look
Assistant Examiner—Kimya N McCoy
(74) Attorney, Agent, or Firm—Kenyon & Kenyon

(57) ABSTRACT

The invention relates to a blade and a rotor for a gas turbine and to a method of joining blade parts of a gas turbine, a blade-body section (1) and at least one further blade part (4, 16, 21) being provided, and the blade-body section (1) being provided with at least one end joining area (2, 3) and the further blade part (4, 16, 21) being provided with an end joining area (6, 18, 24), an inductor (10) being arranged so as to be adjacent to the joining areas (2, 3, 6, 18, 24) of the blade-body section (1) and of the second blade part (4, 16, 21), the joining areas (2, 3, 6, 18, 24) of the blade-body section (1) and of the further blade part (4, 16, 21) being positioned essentially in alignment with and at a distance from one another, and the blade-body section (1) and the second blade part (4, 16, 21) being welded to one another by energizing the inductor (10) with a high-frequency current and by bringing them together with their joining areas (2, 3, 6, 18, 24) touching one another (FIG. 1).

15 Claims, 4 Drawing Sheets

BLADE AND ROTOR FOR A GAS TURBINE AND METHOD FOR LINKING BLADE PARTS

The invention relates to a blade and a rotor for a gas turbine and to a method of joining blade parts of a gas turbine, a blade-body section and at least one further blade part being provided.

Blades for gas turbines essentially comprise a blade body and a blade root, with which the blade is fastened to a rotor or stator. For fluidic control, the blades, i.e. both the guide blades and the moving blades, may have inner and/or outer shroud bands. In this case, it may be necessary, for reasons of strength, to make the blade body and the blade root or the shroud bands from different materials and to therefore first of all provide them individually and to then join them to one another. The latter applies even if the blade body is made, for example, of TiAl by powder metallurgy and cannot be cast or forged for producing the finished blade.

U.S. Pat. No. 3,768,147 discloses a method of producing a blade from a cast blade-body blank and a forged blade root, in which method the blade-body blank has a root considerably enlarged over its cross-sectional area and a likewise enlarged joining section having a joining area, at which a joining area of a blade base is positioned in alignment, the blade-body blank and the blade base being welded to one another by means of friction welding, and then the blade body being produced from the blade-body blank and the blade root being produced from the blade base, for example by machining. In this case, it proves to be a disadvantage that both the blade body and the blade root have to be provided as a blank in order to provide the joining areas required for the friction welding. In addition to considerable consumption of material, this leads to expensive and time-consuming reworking consisting of many production steps. In addition, a considerable bead occurs in the joining area during the welding, which bead likewise has to be removed.

The problem of the invention is to join individual blade parts, as far as possible in their finished form, to make an integral blade or a rotor in as simple a manner as possible from the production point of view, i.e. without a large number of additional machining steps, and to provide a method for this.

According to the invention, the solution to the problem concerning the joining of blade parts is characterized in that a blade-body section is provided with at least one end joining area and the further blade part or if need be a plurality of further parts are provided with an end joining area, an inductor is arranged so as to be adjacent to the joining areas of the blade-body section and of the second blade part, the joining areas of the blade-body section and of the second blade part are positioned essentially in alignment with and at a distance from one another, and the blade-body section and the further blade part are welded to one another by energizing the inductor with a high-frequency current and by bringing them together with their joining areas touching one another.

An advantage of the method according to the invention consists in the fact that the induced, highfrequency current is concentrated in the opposite joining areas and the latter, due to the heating, become pasty or molten only in the region close to the surface, so that the blade-body section and the further blade part are pressed against one another only with a comparatively low force and over an extremely short period. For this reason, the method may also be applied to especially thin-walled, mechanically sensitive or hollow blade-body sections.

In a preferred refinement of the method, the inductor is arranged around the circumference of the joining seam, i.e. around the circumference of the joining areas of the blade-body section and of the further blade part, in which case the inductor can be arranged at a greater distance from the joining seam in the region of the blade leading edge and the blade trailing edge than in the centre region of the blade to influence heating.

At least the blade-body section and/or the further blade part is preferably held in a frictional manner during the positioning, which on account of the comparatively low pressure forces can also be readily effected in the region of the blade body.

Depending on the application, it may alternatively be expedient to hold at least the blade-body section and/or the further blade part in a positive-locking manner during the positioning, e.g. in a plastic block or the like.

In a refinement of the method, a blade root with a second blade-body section having the end joining area is provided as further blade part, it being possible for the blade root to have, for example, a dovetail or a pin or a hook for the detachable fastening to a rotor or stator.

In a further refinement, a shroud band with a second blade-body section having the end joining area is provided as further blade part, and in a further alternative exemplary embodiment a first joining area of the blade-body section is welded to a blade root having a second blade-body section and the end joining area, and an opposite, second end joining area of the blade-body section is welded to a shroud-band section having a second blade-body section and the end joining area.

In an alternative exemplary embodiment, a rotor carrier to be bladed in an integral manner is provided as second blade part, on the circumferential surface of which rotor carrier a plurality of projecting stub sections having in each case the end joining areas are formed, in order thus to provide a rotor bladed in an integral manner.

According to the invention, the solution to the problem concerning the blades is characterized in that the blade-body section and the further blade part, at their joining areas provided in each case at the end face, are welded to one another by induction welding with a high-frequency current.

The advantage of such a blade consists in its cost-effective production, since the individual blade parts can be joined to one another in their finished form without complicated reworking steps. In addition, the structure at the joint has a high strength.

In a preferred refinement, the blade is a moving blade and the further blade part is a blade root with a second blade-body section having the end joining area.

According to the invention, the solution to the problem concerning the rotor is characterized in that the blade-body sections and the stub sections, at their joining areas provided in each case at the end face, are welded to one another by induction welding with a high-frequency current.

Here too, in particular on account of the comparatively large rotor carrier, e.g. designed as a disc or ring, it proves to be advantageous that the blade parts to be joined are already present in their finished form, the welding operation can be carried out relatively quickly, and no complicated reworking steps are necessary.

Further refinements of the invention are described in the subclaims.

The invention is explained in more detail below with the aid of exemplary embodiments and with reference to a drawing, in which:

FIG. 1 shows a perspective and schematic view of a blade-body section and a blade root which are welded to one another in an exemplary embodiment of the method according to the invention, FIG. 2 shows a perspective and schematic view of the blade body according to FIG. 1, in which a shroud-band section is shown at an opposite joining area of the blade-body section, FIG. 3 shows a perspective and schematic view of a blade-body section having a blade root which is welded to a shroud-band section in a further exemplary embodiment of the method according to the invention, FIG. 4 shows a schematic plan view of a joining area around which an inductor connected to a power source is arranged in a configuration of the method according to the invention, and FIG. 5 shows a perspective and schematic view of a rotor, the circumferential stub sections of which are each welded to a blade-body section in a further exemplary embodiment of the method according to the invention.

FIG. 1 shows a blade-body section 1 with a joining area 2, at which the blade-body section 1 is welded to at least one further blade part in a configuration of the method according to the invention. The blade-body section 1 is hollow and is made of TiAl by powder metallurgy. Alternatively, blade-body sections 1 of Ni- or Co-base alloys and also solid blade-body sections 1 or further blade parts of these materials or geometries can also be welded with the method according to the invention.

At its end face opposite the first joining area 2, the blade section 1 has a second end joining area 3 for joining to a further blade part.

To produce an integral (moving) blade for a gas turbine, a blade root 4, which has a second blade-body section 5 with an end joining area 6, is provided in addition to the blade-body section 1. In its shape and size, the joining area 6 of the blade root 9 corresponds essentially to the joining area 2 of the blade-body section 1. The joining areas 2, 3, 6 may be designed to be essentially flat, or also curved, for example. At its end remote from the joining area 6, the blade root 4 has a "dovetail" for the detachable fastening to a rotor rim.

Both the joining areas 2, 3 of the blade-body section 1 and the joining area 6 of the blade root 4 have their final or finished cross-sectional size and are not provided with oversize. Furthermore, thickening or the like for improving the welding operation or for holding the blade-body section 1 or the blade root 4 is provided on neither the blade-body section 1 nor the second blade-body section 5 of the blade root 4, respectively.

In this case, the blade root 4 is held in a fixed position in a holding block 7. The blade-body section 1 is held in a movable holding device 8 indicated by broken lines, it being possible for this to be carried out, on the one hand, in a frictional manner with, for example, two grippers, or in a positive-locking manner in a block, for example made of plastic.

As can be seen from FIG. 1, the joining areas 2 and 6 of the blade-body section 1 and of the blade root 4 are positioned essentially in alignment with one another and at a slight distance from one another before the welding operation. An inductor 10 (shown sectioned) is arranged in an adjacent position around the circumference 9 of the joining areas 2, 6 and is electrically connected in a voltage source 11 shown schematically in FIG. 4. The inductor 10 is formed from an essentially flat copper plate having a thickness of about 5 mm and transfers the welding current into the blade parts to be welded. According to FIG. 4, the distance between the inductor 10 or an inner edge 12 of its cutout and the joining area 2 of the blade-body section 1 or the joining area 6 of the blade root 4 in the region of the blade leading and blade trailing edges 13, 14 is greater than in the centre region 15 in order to achieve uniform heating of the joining areas 2, 6 of the blade-body section 1 or blade root 4, respectively, during the subsequent welding operation. Depending on the application, the geometry of the cutout, or of the inner edge 12, in the inductor 10 is to be selected such that the material becomes pasty to (virtually) molten in the regions close to the surface only at the joint, that is to say the joining areas 2 and 6, in order to permit a rapid welding operation and to avoid, as far as possible, reworking of the joint after the welding operation.

The latter can be achieved by energizing the inductor 10 with a high-frequency current at a frequency of about 1.2 MHz, the frequency being selected as a function of the geometry of the joining areas and generally being above 0.75 MHz. During the welding operation, the blade-body section 1 held in the holding device 8 is moved in accordance with the arrows shown in FIG. 1, so that the joining areas 2 and 6 which are pasty only in the regions close to the surface, of the blade-body section 1 or blade root 4, respectively, touch one another and are welded to one another, only relatively little material having to be pressed outwards in a planar manner and forming a strong forged structure.

FIG. 2 shows an arrangement similar to FIG. 1, having a blade-body section 1 which has a first joining area 2, relative to which an essentially aligned joining area 6, at a slight distance therefrom, of a blade root 4 is positioned. An inductor 10 (shown sectioned) having a cutout and an inner edge 12 is arranged around the joining areas 2 and 6. The blade-body section 1 is held in a holding device 8 in a movable manner. In a further exemplary embodiment explained in more detail with reference to FIG. 3, a second joining area 3 is provided at an end face opposite the first joining area 2 of the blade-body section 1, this second joining area 3 being welded at a shroud-band section 16 to a second blade-body section 17 having an end joining area 18 by means of induction welding with a high-frequency current.

FIG. 3 shows the arrangement indicated schematically in FIG. 2, in which case a blade root 4 has already been welded with its joining area 6 to a first joining area 2 of a blade-body section 1 by induction welding by means of a high-frequency current in an exemplary embodiment of the method according to the invention. FIG. 3 shows a comparatively small bead 19 in the region of a joining seam 20, which projects only slightly and, depending on the application, can be tolerated or has to be reworked only slightly.

In a similar manner as in the arrangement in FIG. 1, a shroud-band section 16 is held in a fixed holder 7 in such a way that its joining area 18 is arranged essentially in alignment with and at a slight distance from the second joining area 3 of the blade-body section 1 for the preparation of the welding operation.

In the same manner, an inductor 10 having a cutout and an inner edge 12 is arranged around the circumference of the joining areas 3 and 18 to be welded. The inductor 10 is electrically connected in accordance with FIG. 4 to a voltage source 11 in order to transfer the welding current into the components to be welded, the maximum current flowing in the regions of the joining areas which are close to the surface. During the welding operation, the blade-body section 1, held in a frictional or positive-locking conventional manner in a holding device B, is moved onto the joining area 18 of the shroud-band section 16 in the direction of the arrows, so that the joining areas 3 and 18, which have become pasty or possibly virtually molten in their regions close to the surface, touch one another. In this two-stage exemplary embodiment of the method according to the invention, first of all the blade root 4 is thus welded to a first joining area 2 and then the shroud-band section 16 is welded to an opposite, second joining area 3 of the blade-body section 1 by induction welding by means of a high-frequency current for producing an integral (moving) blade from individual blade parts 1, 4, 16.

An inductor 10 connected to a voltage source 11 and having a cutout is shown in a plan view according to FIG. 4, the distance of the inner edge 12 of this inductor 10 from the joining seam 20 or the circumference 9 of the joining areas 2, 3, 6, 18 of the blade-body section 1, on the one hand, and of the blade root 4 or shroud-band section 16, on the other hand, being greater in the region of the blade leading edge 13 and the blade trailing edge 14 than in the centre region 15.

FIG. 5 shows a further exemplary embodiment of the method according to the invention, in which a rotor carrier 21 to be bladed in an integral manner is provided as a further blade part. The rotor carrier 21 may be designed as a disc or ring and may be used as a compressor rotor or turbine rotor in a gas turbine. Projecting beyond a circumferential surface 22 of the rotor carrier 21 are a plurality of generally equidistantly arranged stub sections 23, which in each case have a joining area 24 at the end face and whose outer surface, from strength and aerodynamic aspects, conforms to the circumferential surface 22 of the rotor carrier 21.

To produce a rotor bladed in an integral manner, which may be a compressor rotor or a turbine rotor, in each case a blade-body section 1, with its joining area 2, is positioned in alignment with and at a slight distance from the end joining area 24 of the stub sections 23. An inductor 10, in the manner described above, is arranged around the circumference 9 of the joining area 2 of the blade-body section 1 and of the joining area 24 of the stub section 23, respectively. For the welding operation, the inductor 10 is energized with a high-frequency current and the blade-body section 1 and the rotor carrier 21 are brought together, so that their heated joining areas 2 and 24, which are molten only in their layers close to the surface, touch one another and are welded to one another. It is expedient in this case for the blade-body section 1 to be movable and for the rotor carrier 21 to be held in a fixed position. This operation is subsequently repeated for all further stub sections 23, so that a rotor bladed in an integral manner and consisting of the rotor carrier 21 and the essentially radially extending blade-body sections 1 welded to the stub sections 23 by means of a high-frequency current is finally obtained.

The method of joining blade parts can be used for moving and guide blades and for rotor rims of gas turbines made of various materials, such as, for example, TiAl.

What is claimed is:

1. A method for joining blade parts of a gas turbine, comprising the steps of:
   providing a blade-body section having at least one end joining area and at least one further blade part having an end joining area;
   positioning the end joining areas of the blade-body section and the further blade part substantially in alignment with and at a distance from one another;
   arranging an inductor around a circumference of the end joining areas of the blade-body section and the further blade part so that the inductor is disposed at a greater distance from the end joining area in a region of a blade leading edge and a blade trailing edge than in a center region of the blade; and
   welding the blade-body section and the further blade part to one another by energizing the inductor and by bringing the blade-body section and the further blade part together with a low force and with the end joining areas touching one another, inductor being energized with a high-frequency current at a frequency in a range of 0.75 MHz and 1.2 MHz.

2. The method according to claim 1, wherein the end joining areas of the blade-body section and the further blade part are positioned at a distance of approximately 2 mm from one another in the positioning step.

3. The method according to claim 1, wherein the positioning step includes the substep of frictionally holding at least one of the blade-body section and the further blade part.

4. The method according to claim 1, wherein the positioning step includes the substep of holding in a positive-locking manner at least one of the blade-body and the further blade part.

5. The method according to claim 1, wherein the welding step includes the substep of moving the blade-body section and the further blade part toward each other a distance of at most 1 mm after the end joining areas thereof touch one another.

6. The method according to claim 1, wherein the further blade part includes a blade root having a second blade-body section, the second blade-body section including the end joining area.

7. The method according to claim 1, wherein the further blade part includes a rotor carrier to be integrally bladed, a circumferential surface of the rotor carrier including a plurality of projecting stub sections, each of the projecting stub sections including the end joining area.

8. A method for joining blade parts of a gas turbine, comprising the steps of:
   providing a blade-body section having at least one end joining area and at least one further blade part, wherein the further blade part includes a shroud-band section having a second blade-body section, the second blade-body section including an end joining area;
   positioning the end joining areas of the blade-body section and the further blade part substantially in alignment with and at a distance from one another;
   arranging an inductor around a circumference of the end joining areas of the blade-body section and the further blade part so that the inductor is disposed at a greater distance from the end joining area in a region of a blade leading edge and a blade trailing edge than in a center region of the blade; and
   welding the blade-body section and the further blade part to one another by energizing the inductor and by bringing the blade-body section and the further blade part together with the end joining areas touching one another, the inductor being energized with a high-frequency current at a frequency in a range of 0.75 MHz and 1.2 MHz.

9. A method for joining blade parts of a gas turbine, comprising the steps of:
   providing a blade-body section having at least one end joining area and at least one further blade part having an end joining area;
   positioning the end joining areas of the blade-body section and the further blade part substantially in alignment with- and at a distance from one another;

arranging an inductor around a circumference of the end joining areas of the blade-body section and the further blade part so that the inductor is disposed at a greater distance from the end joining area in a region of a blade leading edge and a blade trailing edge than in a center region of the blade; and welding the blade-body section and the further blade part to one another by energizing the inductor and by bringing the blade-body section and the further blade part together with the end joining areas touching one another, the inductor being energized with a high-frequency current at a frequency in a range of 0.75 MHz and 1.2 MHz, wherein the welding step includes the substeps of welding a first joining area of the blade-body section to a blade root having a second blade-body section and the end joining area, and welding an opposite, second end joining area of the blade-body section to a shroud-band section having a second blade-body section and the end joining area.

10. A blade for a gas turbine, comprising:

a blade-body section; and at least one further blade part;

wherein an end face of each of the blade-body section and the at least one further blade part including a joining area, the joining areas being welded to one another by bringing the blade-body section and the further blade part together with a low force and by induction welding with a high-frequency current at a frequency within a range of 0.75 MHz to 1.2 MHz while forming a forged structure.

11. The blade according to claim 10, wherein the further blade part includes a blade root having a second blade-body section, the second blade-body section having the joining area.

12. The blade according to claim 10, wherein the further blade part includes a rotor carrier to be integrally bladed, the rotor carrier including a circumferential surface having a plurality of stub sections, each of the stub sections having a joining area.

13. A blade for a gas turbine, comprising:

a blade-body section; and at least one further blade part, wherein the further blade part includes a shroud-band section having a second blade-body section, the second blade-body section having a joining area;

wherein an end face of each of the blade-body section and the at least one further blade part including a joining area, the joining areas being welded to one another by induction welding with a high-frequency current at a frequency within a range of 0.75 MHz to 1.2 MHz while forming a forged structure.

14. A blade for a gas turbine, comprising:

a blade-body section, wherein the blade-body section includes a first joining area welded to a joining area of a blade root and an opposite, second joining area welded to a joining area of a shroud-band section;

at least one further blade part;

wherein an end face of each of the blade-body section and the at least one further blade part including the joining area, the joining areas being welded to one another by induction welding with a high-frequency current at a frequency within a range of 0.75 MHz to 1.2 MHz while forming a forged structure.

15. A rotor for a gas turbine, comprising:

a rotor carrier having a circumferential surface, a plurality of stub sections projecting beyond the circumferential surface, each stub section having an end joining area; and a plurality of blade-body sections, each of the blade-body sections having an end joining area;

wherein an end face of the end joining area of the stub section and an end face of the end joining area of a respective blade-body section are welded by induction welding with a high-frequency current at a frequency in a range of 0.75 MHz to 1.2 MHz while forming a forged structure substantially without reworking steps.

\* \* \* \* \*

UNITED STATES PATENT AND TRADEMARK OFFICE
CERTIFICATE OF CORRECTION

PATENT NO.   : 6,616,408 B1
DATED        : September 9, 2003
INVENTOR(S)  : Reinhold Meier It is certified that error appears in the above-identified patent and that said Letters Patent is hereby corrected as shown below:

Title page,
Item [54], Title, please change "BLADE AND ROTOR FOR A GAS TURBINE AND METHOD FOR LINKING BLADE PARTS" to -- BLADE AND ROTOR FOR A GAS TURBINE AND METHOD OF JOINING BLADE PARTS --;
Item [57], ABSTRACT, please change the abstract from "The invention relates to a blade and a rotor for a gas turbine and to a method of joining blade parts of a gas turbine, a blade-body section (1) and at least one further blade part (4 , 16, 21) being provided, and the blade-body section (1) being provided with at least one end joining area (2 , 3) and the further blade part (4 , 16, 21) being provided with an end joining area (6, 18, 24), an inductor (10) being arranged so as to be adjacent to the joining areas (2, 3, 6, 18, 24) of the blade-body section (1) and of the second blade part (4, 16, 21), the joining areas (2, 3, 6, 18, 24) of the blade-body section (1) and of the further blade part (4, 16, 21) being positioned essentially in alignment with and at a distance from one another, and the bladebody section (1) and the second blade part (4, 16, 21) being welded to one another by energizing the inductor (10) with a high-frequency current and by bringing them together with their joining areas (2, 3, 6, 18, 24) touching one another (Fig. 1)."
to
-- In a blade and a rotor for a gas turbine and a method of joining blade parts of a gas turbine, a blade-body section and at least one further blade part is provided. The blade-body section includes at least one end joining area, and the further blade part includes an end joining area. An inductor is arranged so as to be adjacent to the joining areas of the blade-body section and of the second blade part. The joining areas of the blade-body section and of the further blade part are positioned substantially in alignment with and at a distance from one another, and the blade-body section and the second blade part are welded to one another by energizing the inductor with a high-frequency current and by bringing them together with their joining areas touching one another. --;

Column 1,
Line 1, please change the title from "Blade and Rotor For a Gas Turbine and Method For Linking Blade Parts" to -- Blade and Rotor For a Gas Turbine and Method of Joining Blade Parts --;
Line 4, insert -- FIELD OF THE INVENTION --;
Line 5, before "invention" insert -- present --;
Between line 8 and 9, insert -- BACKGROUND INFORMATION --;
Line 9, change "essentially comprise" to -- include --;
Line 11, change "i.e." to -- i.e., --;
Line 13, change "In this case, it" to -- It --;
Lines 13-14, delete "reasons of";
Line 14, after "strength" insert -- reasons --;

UNITED STATES PATENT AND TRADEMARK OFFICE
CERTIFICATE OF CORRECTION

PATENT NO. : 6,616,408 B1
DATED : September 9, 2003
INVENTOR(S) : Reinhold Meier It is certified that error appears in the above-identified patent and that said Letters Patent is hereby corrected as shown below:

Column 1 cont.,
Line 20, change "discloses" to -- describes --;
Line 23, change "likewise" to -- correspondingly --;
Line 31, change "have to be" to -- are --;
Line 34, change "leads to" to -- arrangement results in --;
Line 37, change "likewise has to" to -- must --;
Line 38, change "The problem of the" to -- It is an object of the present --;
Line 39, change "far" to -- much --;
Line 41, change "from the production point of view, i.e." to -- with regard to production, i.e., --;
Line 43, change "for this" to -- therefor --;
Between line 43 & 44, insert -- SUMMARY --;
Line 44, change "According to the invention," to -- According to one example embodiment of the present invention, --;
Line 58, change "An" to -- One --;
Line 58, before "invention" insert -- present --;
Line 59, change "consists in" to -- relates to --;

Column 2,
Line 1, change "In a preferred refinement of the method," to -- In an example embodiment of the method according to the present invention --;
Line 2, after "i.e." insert -- , --;
Line 5, change "can" to -- may --;
Line 10, change "is preferably" to -- may be --;
Line 11, change "on account of" to -- due to --;
Line 12, change "can also be readily" to -- may also be --;
Line 14, delete "it may alternatively be expedient to hold";
Line 15, after "part" insert -- may be held --;
Line 17, change "e.g. in a plastic block or the like." to -- e.g., in a plastic block, etc. --;
Line 18, change "In a refinement of the method, a" to -- A --;
Line 19, after "area" change "is" to -- may be --;
Lines 20 and 25, after "as" insert -- a --;
Line 23, change "In a further refinement, a" to -- A --;
Line 24, after "area" change "is" to -- may be --;
Lines 25 and 32, change "exemplary" to -- example --;
Line 38, before "invention" insert -- present --;
Line 43, change "consists in" to -- relates to --;
Line 44, change "can" to -- may --;
Line 48, change "In a preferred refinement, the blade is" to -- The blade may be --;
Line 49, change "is" to -- may be --;
Line 51, before "invention" insert -- present --;

UNITED STATES PATENT AND TRADEMARK OFFICE
CERTIFICATE OF CORRECTION

| | |
|---|---|
| PATENT NO. | : 6,616,408 B1 |
| DATED | : September 9, 2003 |
| INVENTOR(S) | : Reinhold Meier |

It is certified that error appears in the above-identified patent and that said Letters Patent is hereby corrected as shown below:

Column 2 cont.,
Line 54, before "welded" change "are" to -- may be --;
Line 56, change "Here too, in particular on account of" to -- Due to --;
Line 57, change "e.g." to -- e.g., --;
Line 58-59, change "are already present" to -- may be --;
Line 60, change "can" to -- may --;
Line 61, change "are" to -- may be --;
Delete lines 62-68, "Further refinements...welded to one";

Column 3, delete lines 1-18 and replace with the following text:
-- BRIEF DESCRIPTION OF THE DRAWINGS
      Fig.1 is a prespective and schematic view of a blade-body section and a blade root that are welded to one another according to an example embodiment of the method according to the present invention.

Figure 1:
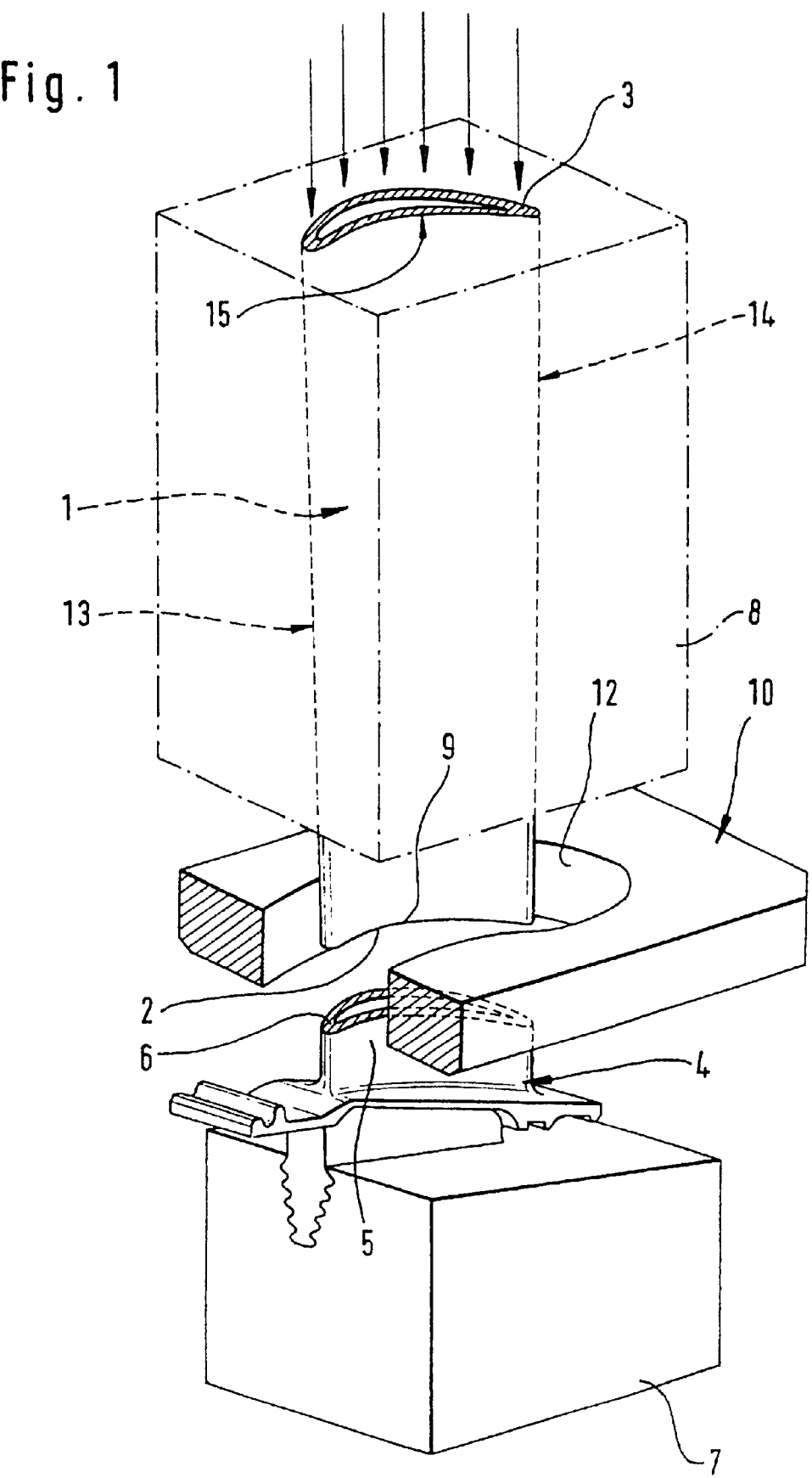
Figure 2:
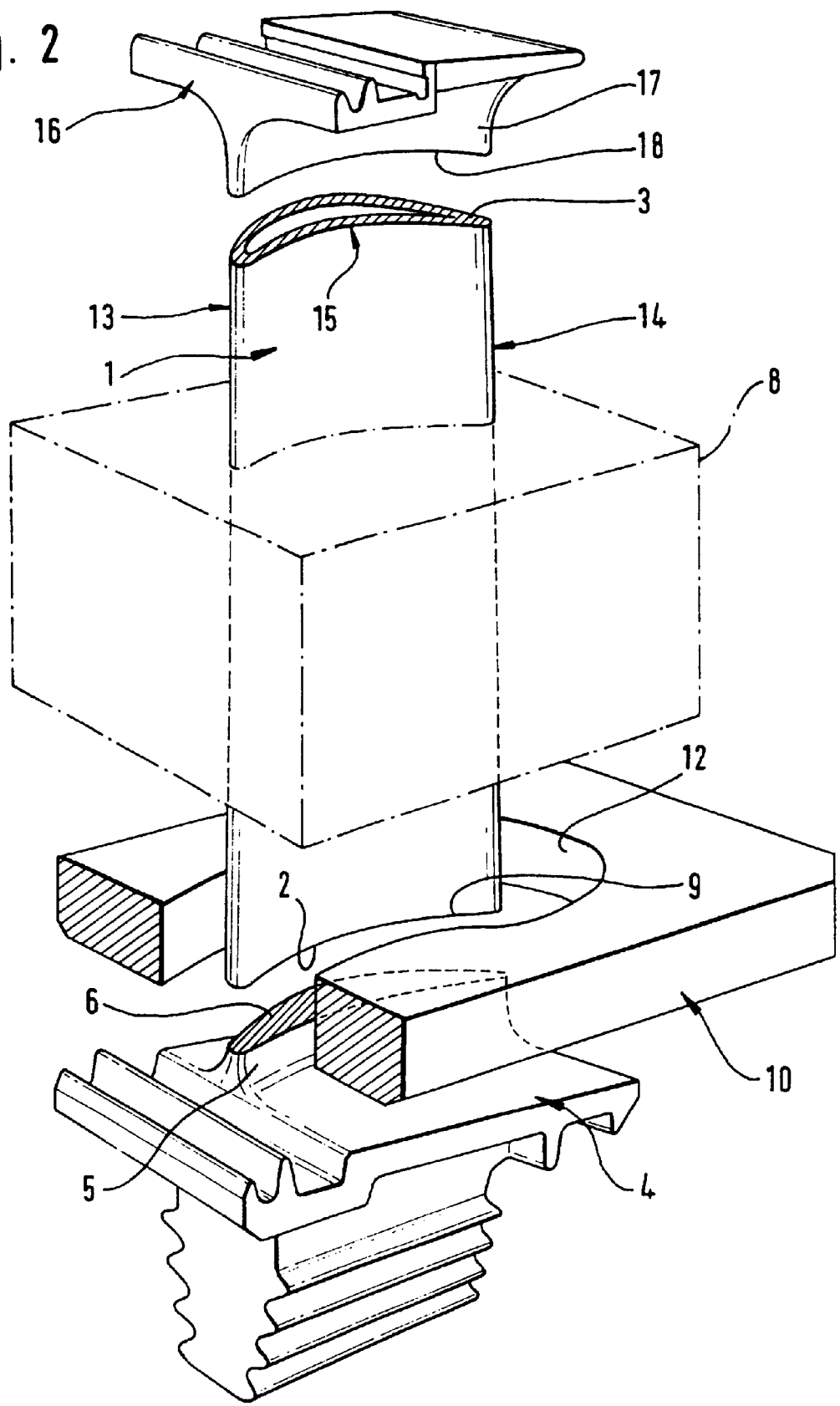
Fig.2 is a perspective and schematic view of the blade body illustrated in Fig.1, in which a shroud-band section is illustrated at an opposite joining area of the blade-body section.
Figure 3:
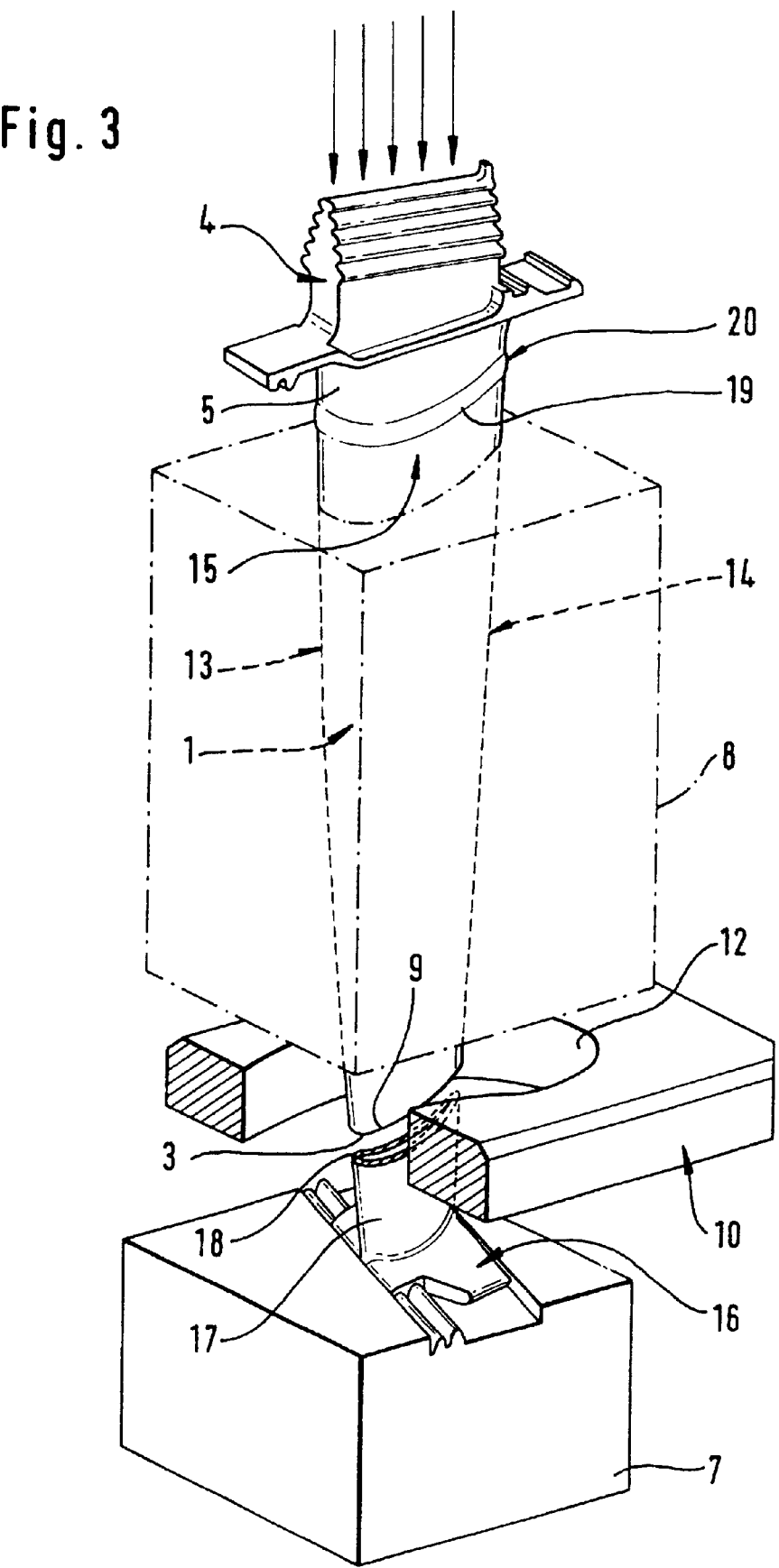
Fig. 3 is a perspective and schematic view of a blade-body section having a blade root that is welded to a shroud-band section in a further example embodiment of the method according to the present invention.
Figure 4:
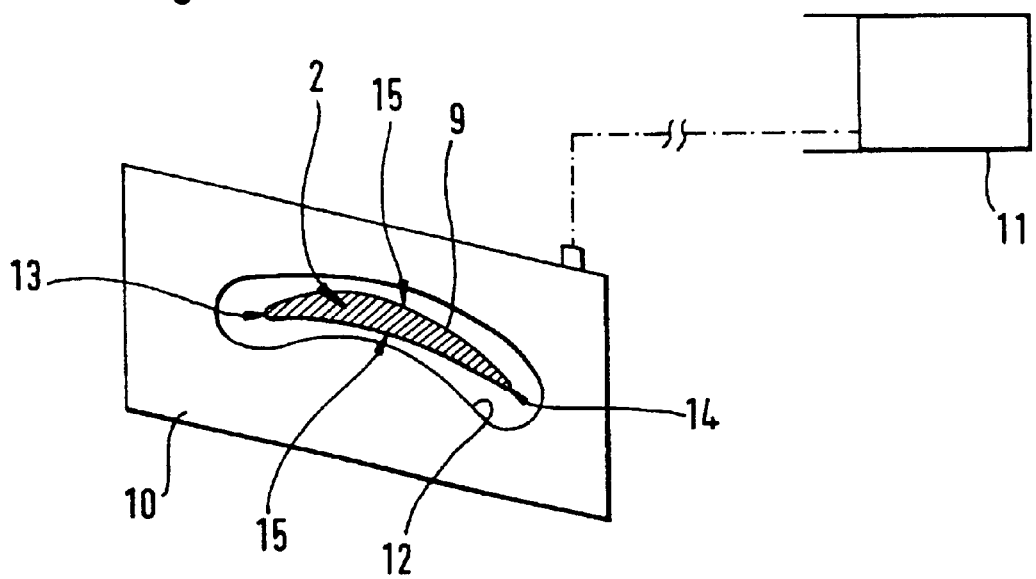
Fig. 4 is a schematic plan view of a joining area around which an inductor connected to a power source is arranged in a configuration of the method according to the present invention.
Figure 5:
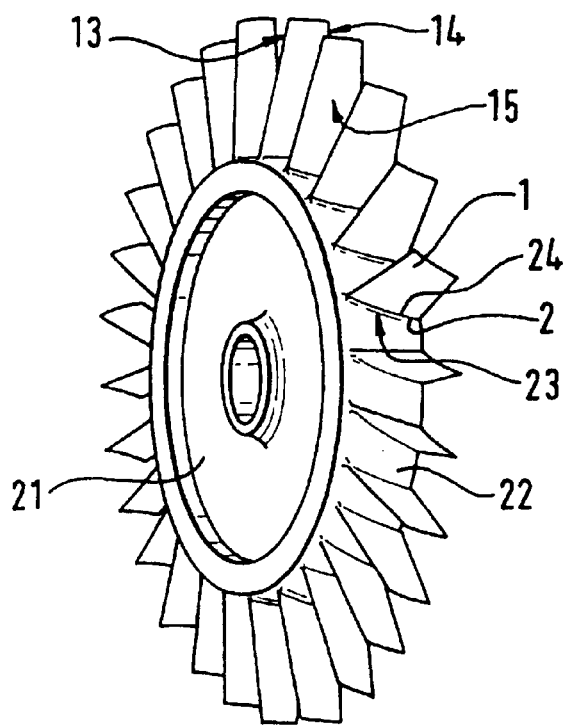
Fig. 5 is a perspective and schematic view of a rotor, the circumferential stub sections of which are each welded to a blade-body section in a further example embodiment of the method according to the present invention.

Column 3,
Line 19, change "shows" to -- illustrates --;
Line 22, before "invention" insert -- present --;
Line 26, change "can" to -- may --;
Lines 29 and 32, change "has" to -- includes --;
Lines 35 and 57, change "essentially" to -- substantially --;
Line 37, change "designed to be essentially" to -- configured to be substantially --;
Line 39, change "has" to -- includes --;
Line 47, after "4" delete ", respectively";
Line 48, change "In this case, the" to -- The --;

UNITED STATES PATENT AND TRADEMARK OFFICE
CERTIFICATE OF CORRECTION

PATENT NO.    : 6,616,408 B1
DATED         : September 9, 2003
INVENTOR(S)   : Reinhold Meier It is certified that error appears in the above-identified patent and that said Letters Patent is hereby corrected as shown below:

Column 3 cont.,
Line 51, change "carried out, on the one hand," to -- achieved --;
Line 55, change "can be seen from" to -- illustrated in --;
Line 59, change "sectioned" to -- sectionally --;
Line 63, change "an essentially" to -- a substantially --;
Line 65, change "According to" to -- As illustrated in --;

Column 4,
Line 2, change "centre" to -- center --;
Line 4-5, after "4" delete ", respectively, ";
Line 7, change "such" to -- so --;
Line 9, change "that is to say" to -- i.e., --;
Line 13, change "can" to -- may --;
Line 19, change "shown" to -- illustrated --;
Line 24, change "outwards" to -- outwardly --;
Line 26, change "shows" to -- illustrates --;
Line 26, after "similar to" insert -- that illustrated in --;
Line 27, change "which" to -- that --;
Line 30, change "sectioned" to -- sectionally --;
Line 33, change "exemplary" to -- example --;
Lines 41 and 46, change "shows" to -- illustrates --;
Line 45, change "exemplary" to -- example --;
Line 49, change "can be tolerated or has to" to -- may be tolerated or must --;
Line 51, change "arrangement" insert -- illustrated --;
Line 52, change "in such a way" to -- so --;
Line 53, change "essentially" to -- substantially --;
Line 60, change "in accordance with" to -- as illustrated in --;

Column 5,
Line 4, change "exemplary" to -- example --.
Line 5, before "invention" insert -- present --;
Line 5, delete "first of all";
Line 8, delete "means of";
Line 12, change "shown in a plan view according to" to -- illustrated in a plan view in --;
Line 18, change "centre" to -- center --;
Line 20, change "shows a further exemplary" to -- illustrates a further example --;
Line 21, before "invention" insert -- present --;
Lines 27 and 32, delete "in each case";

UNITED STATES PATENT AND TRADEMARK OFFICE
CERTIFICATE OF CORRECTION

PATENT NO. : 6,616,408 B1
DATED : September 9, 2003
INVENTOR(S) : Reinhold Meier It is certified that error appears in the above-identified patent and that said Letters Patent is hereby corrected as shown below:

<u>Column 5 cont.,</u>
Line 38, after "23" delete ", respectively";
Line 44, change "It is expedient in this case for the" to -- The --;
Line 45, change "to be movable" to -- may be movable --;
Line 45, delete "for";
Line 45, change "to be held" to -- may be held --;
Line 50, delete "means of";
Line 52, change "can" to -- may --;

<u>Column 6,</u>
Line 7, before "inductor" insert -- the --; and
Last line, change "with- and" to -- with and --.

Signed and Sealed this

Fourteenth Day of September, 2004

JON W. DUDAS
*Director of the United States Patent and Trademark Office*